United States Patent
Dockery

[15] 3,695,681
[45] Oct. 3, 1972

[54] SELF-DEFROSTING WINDSHIELD WITH AUTOMATICALLY VARIABLE TRANSPARENCY

[72] Inventor: Walter E. Dockery, 2120 La Vera Drive, Tuscaloosa, Ala. 35401

[22] Filed: Aug. 21, 1970

[21] Appl. No.: 65,884

[52] U.S. Cl. ............296/97 F, 52/171, 350/267, 350/312
[51] Int. Cl. ................................B60j 3/04
[58] Field of Search............296/97 R, 97 F; 52/171; 219/203; 350/161, 267, 312

[56] References Cited

UNITED STATES PATENTS

| | | | |
|---|---|---|---|
| 2,332,060 | 10/1943 | Colleran | 52/171 |
| 2,537,011 | 1/1950 | Aparicio | 350/161 |
| 2,386,339 | 10/1945 | O'Connor | 52/171 |
| 3,343,868 | 9/1967 | Manookian | 296/97 |
| 1,903,917 | 4/1933 | Dysart | 296/97 |

FOREIGN PATENTS OR APPLICATIONS

| | | | |
|---|---|---|---|
| 778,128 | 2/1968 | Canada | 350/312 |
| 2,007,664 | 1/1970 | France | 52/171 |

*Primary Examiner*—Benjamin Hersh
*Assistant Examiner*—Leslie J. Paperner
*Attorney*—Polachek, Saulsbury & Hough

[57] ABSTRACT

A windshield assembly includes two window panes with an elastic peripheral cushion therebetween defining a compartment through which a heated, tinted liquid is circulated under thermostat control. Hydraulically operated cylinders connected to one window pane moves it with respect to the other window pane under control of a photoresponsive device for changing the transparency of the liquid in the compartment.

4 Claims, 6 Drawing Figures

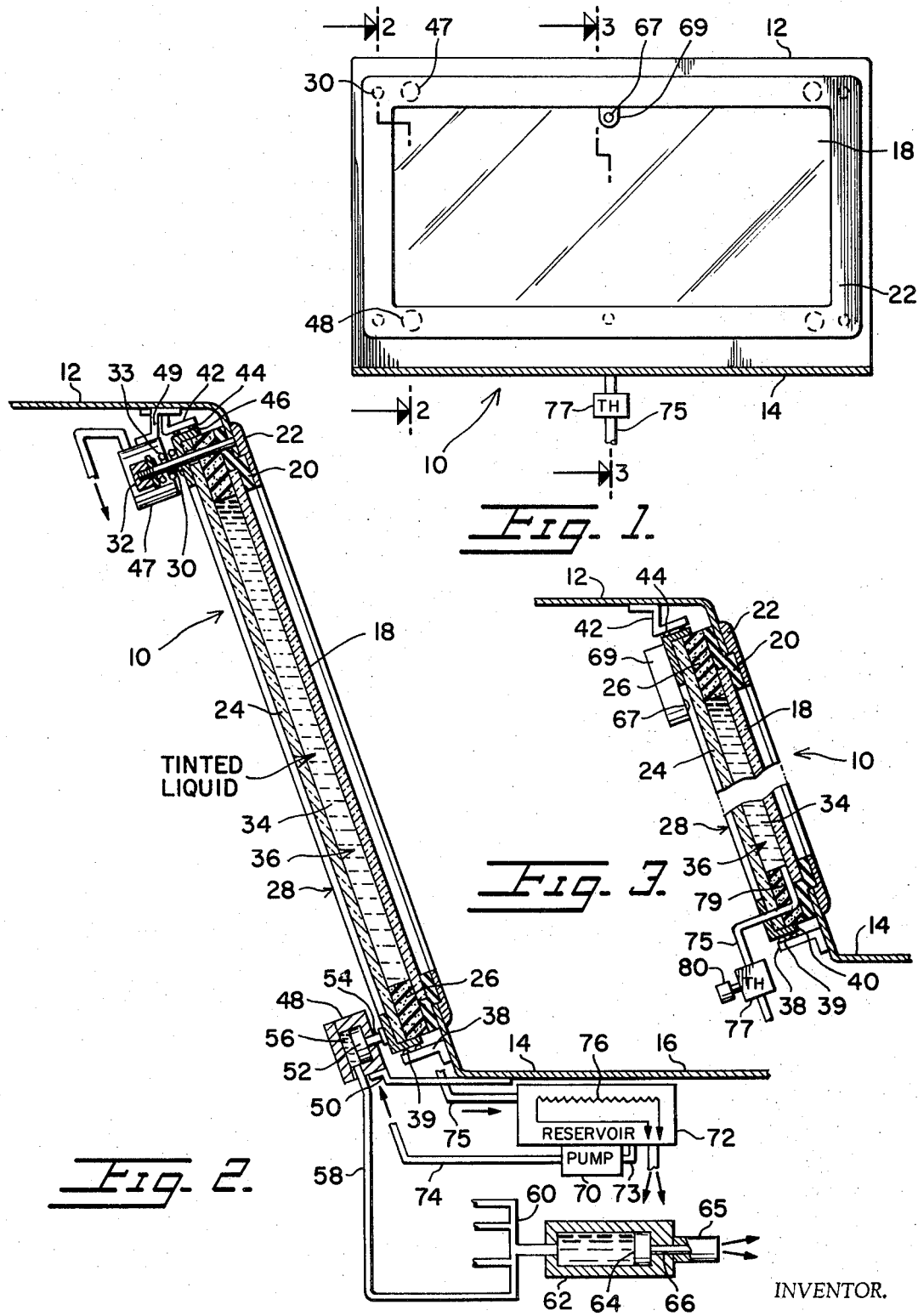

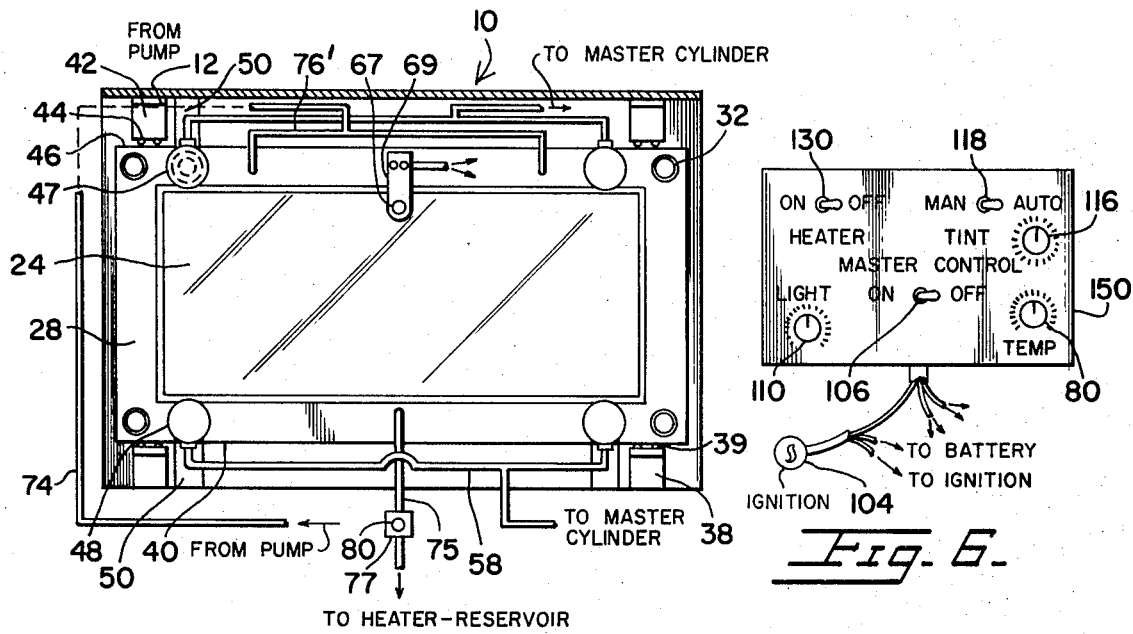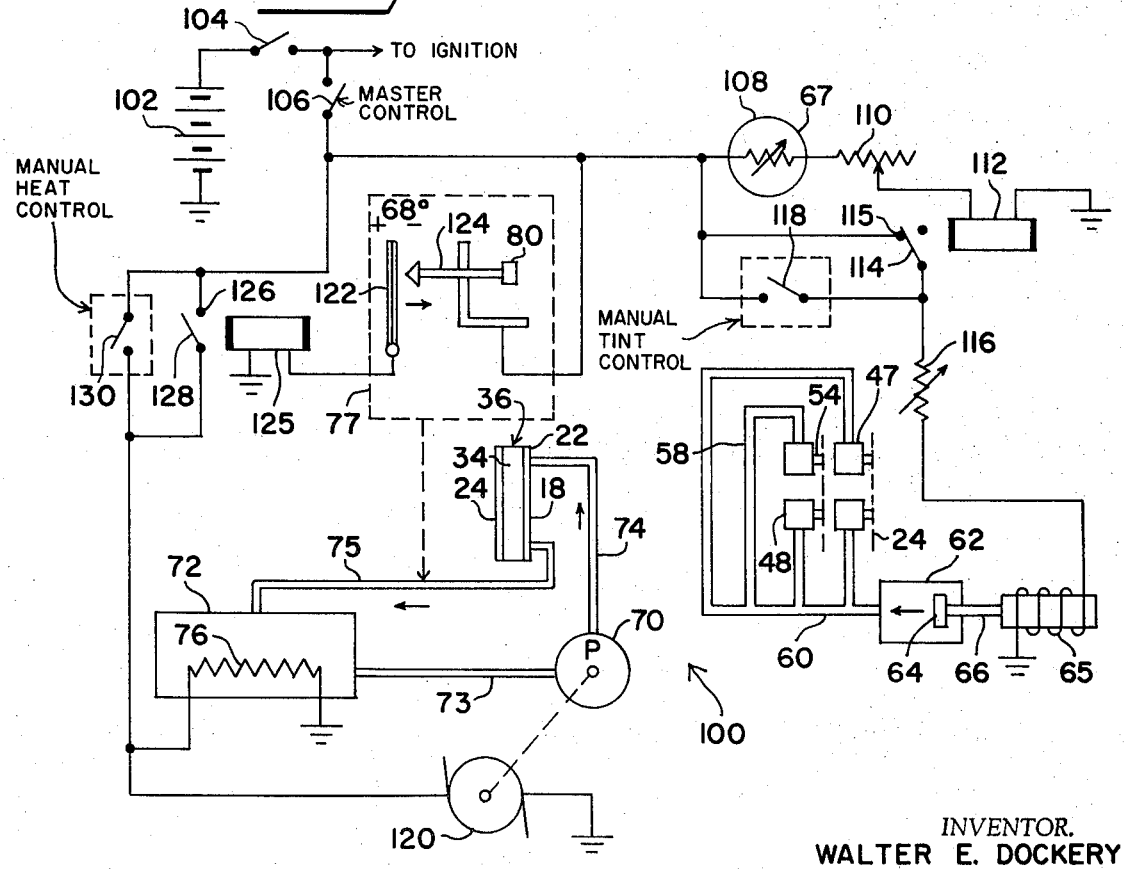

3,695,681

SELF-DEFROSTING WINDSHIELD WITH AUTOMATICALLY VARIABLE TRANSPARENCY

This invention relates to the art of windshields for automotive vehicles and more particularly concerns a heated, self-defrosting tinted windshield whose transparency is automatically variable.

It has been proposed heretofore to provide a windshield having a pair of relatively movable transparent panes enclosed in a peripheral frame in such a way as to define a compartment into which a tinted liquid can be passed to vary transparency of the windshield. This system has not been found practical because of a number of serious deficiencies. In the first place, it has not been found feasible to use the tinted liquid to force the panes apart. Secondly, the prior systems required manual control and did not effect change in transparency automatically. Thirdly, the prior systems lacked self-defrosting heating features. Other difficulties involved complexity, high cost and lack of general versatility of the prior systems.

The present invention is directed at a windshield assembly which overcomes the difficulties and disadvantages heretofore encountered and in addition affords advantages not attainable in prior windshields. According to the invention there is provided a windshield assembly having movably spaced inner and outer panes closed peripherally by a flexible frame. The inner pane is movable by a hydraulically controlled mechanical system. A tinted liquid which serves as a light filter is circulated between the panes by a pump. The liquid may be heated to effect melting of ice and snow on the outer pane and to dissipate condensation of moisture on the inner pane. The movement of the inner pane is automatically controllable by a light responsive photoelectric cell to vary the quantity of tinted liquid between the pane for changing its transparency. A thermostat controls heating of the circulating liquid. The assembly is arranged so that heating and transparency variation can be automatically or manually controlled, and each can be independently activated or deactivated.

Other and further features, objects and advantages of the invention will become apparent from the following detailed description taken together with the drawings, wherein:

FIG. 1 is a front view of a windshield assembly embodying the invention.

FIG. 2 is an enlarged vertical sectional view taken on line 2—2 of FIG. 1.

FIG. 3 is an enlarged vertical sectional view with parts broken away taken on line 3—3 of FIG. 1.

FIG. 4 is a rear view of the windshield assembly.

FIG. 5 is a diagram of the control circuitry of the assembly.

FIG. 6 is a front view of the control panel of the assembly.

Referring first to FIGS. 1-4, there is shown a windshield assembly 10 for an automotive vehicle having a roof 12, cowl 14 and hood 16. The windshield assembly includes an outer or front window pane 18 mounted in a support which includes a resilient sealing gasket 20 and rectangular front frame 22. A movable inner window pane 24 is disposed parallel to and behind pane 18. Interposed between the panes 18, 24 at their peripheral margin is an elastic frame 26. The rear peripheral margin of pane 24 is backed by an L-shaped frame 28. Frames 22 and 28 are rigid members. Bolts 30 integral with frame 22 extend rearward through registering holes in gasket 20, frame 26, pane 24 and frame 28. The bolts terminate in threaded ends on which are cap nuts 32. Coil springs 33 on the bolts bear against frame 28 and thus maintain a tight seal between the panes 18, 24 and frame 26. Frame 26 can be compressed to reduce the spacing between the panes and to lower the volume of liquid 34 in compartment 36 defined between the panes and frame 26. Liquid 34 is tinted green or other desired color and has such a low freezing point that for all practical purposes it may be considered non-freezing. The liquid can be an aqueous solution of propylene glycol or other antifreeze agent.

The inner pane is supported at its lower edge by bearing brackets 38 attached to cowl 14. Brackets 38 have ball bearings 39 on which the lower wall 40 of frame 28 is slidable. Upper brackets 42 are attached to roof 12 and have ball bearings 44. The upper wall 46 of frame 28 slidably contacts bearings 44. Two upper hydraulic cylinders 47 and two lower cylinders 48 are employed to move the pane 24. The extent of travel of pane 24 is about one quarter of an inch or so toward and away from outer pane 18. Each cylinder 47 and 48 is supported by a bracket 49 or 50 on roof 12 or cowl 14. Inside each cylinder is a piston 52 having a piston rod 54 secured to the rear wall of frame 28. Hydraulic fluid 56 inside the cylinder passes into and out of the cylinder via a lateral conduit 58 connected via manifold 60 to master cylinder 62. Cylinder 62 is located under hood 16. The fluid can be forced into cylinders 47, 48 by a piston 64 in cylinder 62 actuated by plunger 66 of a solenoid 65. By this arrangement the inner pane can be moved closer to pane 24 while frame 26 is compressed. Relaxation of fluid pressure in the cylinders permits expansion of the compressed elastic frame. Movement of pane 24 is under control of a photoelectric cell 67 mounted in a housing 69 at the top of frame 28.

Liquid 34 is circulated through compartment 36 by a pump 70. The pump draws the liquid from a tank or reservoir 72 and passes it via main line 74 and branch lines 76' through openings in frame 28 and pane 24 to the top of compartment 36. Liquid 34 returns to the reservoir via return line or conduit 75. The reservoir contains an electric heater 76 connected in circuit with thermostat 77 on return line 75 which opens into the bottom of compartment 36 via openings in frame 28 and frame 24 and passage 79 in elastic frame 26; see FIG. 3. The thermostat has an adjustment knob 80.

FIG. 5 shows the circuitry 100 of the system. Battery 102 is connected to key operated ignition switch 104 conventionally provided in an automotive vehicle. This switch is connected to an ignition coil (not shown). Connected to switch 104 is a manually operable master control switch 106 which selectively activates and deactivates the control circuitry of the windshield assembly. Connected in series with switch 106 is a photoconductive photoelectric cell 108. This cell is connected in series with adjustable resistor 110 and the coil of a relay 112. The relay has normally closed contacts 114, 115 which are open when the relay is energized. This occurs when daylight impinges on the photoelectric cell to increase its conductance. Contact 115 is connected to switch 106. Contact 114 is connected in series with variable resistor 116 and solenoid 65. The solenoid is energized only when contacts 114, 115 close and this occurs only when the relay becomes deenergized due to decrease in the light level impinging on the photoelectric cell. When the solenoid is energized it advances piston 64 to drive hydraulic fluid through conduits 60 and 58 to cylinders 47, 48. This advances pistons 54 which then move the inner pane 24 forwardly to reduce the size of compartment 36.

A manually operable switch 118 is connected across contacts 114, 115 to short circuit them when the contacts 114, 115 are open for operating the solenoid 65 and moving pane 22 independently of the light intensity impinging on the photoelectric cell.

The liquid 34 disposed between panes 18 and 24 is pumped via conduit 74 by pump 70. The pump is driven by a motor 120. The pump draws liquid 34 from reservoir 72 via pipe 73. Liquid is returned to the reservoir via conduit 75. On this conduit is thermostat 77. The thermostat has a movable bimetallic element 122 disposed to contact adjustable terminal 124 when the temperature of the returning liquid is below a predetermined value, for example 68° F. Element 122 is connected in series with the coil of relay 125. Terminal 124 is adjustably spaced from element 122 by means of adjustment knob 80. Terminal 124 is connected to switch 106. Relay 125 has normally open contacts 126, 128 connected in series with switch 106 and heater reservoir 72. When relay 125 is energized due to fall in temperature of returning liquid 34, heater 76 becomes energized to heat the liquid. The heater 76 is connected in parallel with motor 120 so that the motor runs and drives pump 70 to circulate the liquid 34 while it is being heated. A manually operable switch 130 is connected in parallel with contacts 126, 128 to run the motor and heater at any time independently of the temperature of the liquid.

It will be apparent from the arrangement described, that the hydraulic system including master cylinder 62 and cylinders 47, 48 serve to reduce the volume of compartment 36 by moving the pane 24 forwardly toward pane 18. The effect is to reduce the quantity of tinted liquid in chamber 36 and thus increase its transparency. Therefore when ambient light falling on the photoelectric cell decreases, the transparency of the windshield is automatically increased. The light intensity value to which the photoelectric cell will respond is adjusted by means of resistor 110. The distance that pane 24 moves is adjusted by variable resistor 116.

FIG. 6 shows the various control switches and resistors mounted on a control panel 150 which can be installed adjacent to the dashboard of the vehicle. On panel 150 is master control switch 106, switch 118 which enables manual operation of the hydraulic system to vary transparency of the windshield, and switch 130 which manually turns on the heater and pump. Adjustable control 80 sets the temperature at which the heater and pump will be operated. Adjustable resistor 110 sets the light intensity at which the photoelectric cell will respond and adjustable resistor 116 sets the amount that the pane 24 will move. This occurs because the movement of pane 24 by the hydraulic system takes place against compressive resistance of elastic frame 26. Setting resistor 116 will determine then the force applied by the energized solenoid to the hydraulic system. Adjacent to panel 150 is key operated ignition lockswitch 104 which is connected in circuit with the system shown in FIG. 5.

An important feature of the invention is that the photoelectric cell or electric eye operates the transparency controlling hydraulic system automatically. Thus the driver of the vehicle has his hands free to operate the vehicle. Another important feature is that the heated liquid circulates freely for defrosting the outer pane 18 and for evaporating condensed moisture on the inner pane 24. The circulation system is not required to mechanically separate the panes or reduce their spacing. This is done by the elasticity of frame 26 and the hydraulic system. It will be noted that the degree of tint is adjustable by adjustably varying the reduction in volume in chamber 36 by means of tint control 116. Also the heated liquid can be circulated independently of spacing between panes 18, 24. This is an advantage over prior systems, where tinted liquid was pumped into and out of the space between fixed and movable panes to change their spacing. A further advantage of the present system is the automatic operation of the heater and liquid circulation system to prevent frost and ice accumulation on the windshield.

The windshield assembly as described is simple to install and operate. It meets a long felt need in the automotive field for an improved self-defrosting windshield of variable transparency.

While a preferred embodiment of the invention has been described and illustrated, it will be apparent that many modifications are possible without departing from the invention.

What is claimed is:

1. A windshield assembly comprising a first transparent window pane; first support means for mounting the same in an automotive vehicle for admitting light into the vehicle; a second transparent window pane disposed parallel to and spaced from the first pane; elastic cushion means enclosing peripheries of both panes to define a compartment therebetween for containing a tinted liquid; second support means for the second pane movably supporting the second pane to change its spacing from the first pane and to change thereby the volume of said compartment and transparency of said liquid, mechanical means arranged to move the second pane toward the first pane against resistance of said elastic cushion means; liquid circulation means communicating with said compartment for circulating said liquid independently of the spacing between the panes; light responsive means disposed to sense ambient light impinging on the window panes; and electromechanical means operatively arranged in connection with said mechanical means and said light responsive means to move the second pane toward the first pane when the ambient light falls below a certain light intensity to increase the transparency of liquid in said compartment; switch means connected in circuit with the electromechanical means for moving said second pane to change the volume of said compartment independently of the intensity of ambient light impinging on the window panes; means for heating the liquid circulating through said compartment; switch means connected in circuit with the liquid circulation means for starting and stopping circulation of the liquid independently of the temperature of the liquid sensed by the thermostat; said mechanical means comprises hydraulic cylinders having pistons arranged to engage and move the second window pane, said electromechanical means being arranged to drive hydraulic fluid into the cylinders for moving the second window pane; said liquid circulation means comprising a reservoir for the liquid connected to said compartment, and a pump connected between the reservoir and compartment to circulate the liquid through the compartment.

2. A windshield assembly as defined in claim 1, and electric control means connected in circuit with the liquid circulation means and electromechanical means for actuating the liquid circulation means and mechanical means independently of each other.

3. A windshield assembly as defined in claim 1, further comprising a thermostat arranged to sense the temperature of said liquid circulating through said compartment; and circuit means connecting the thermostat in circuit with the liquid circulation means to start and stop circulation of the liquid depending on the temperature setting of the thermostat.

4. A windshield assembly as defined in claim 1, further comprising other switch means connected in circuit with the electromechanical means for moving said second pane to change the volume of said compartment independently of the intensity of ambient light impinging on the window panes.

* * * * *